United States Patent

Dotter, Jr.

[15] 3,707,683

[45] Dec. 26, 1972

[54] TIMING RECOVERY CIRCUIT FOR USE IN MODIFIED DUOBINARY TRANSMISSION SYSTEM

[72] Inventor: Berton E. Dotter, Jr., Belmont, Calif.

[73] Assignee: GTE Automatic Electric Laboratories Incorporated, Northlake, Ill.

[22] Filed: Nov. 15, 1971

[21] Appl. No.: 198,883

[52] U.S. Cl. ................328/139, 178/68, 178/69.5 R, 307/269, 328/32, 328/63, 328/140

[51] Int. Cl. ..............................................H03b 1/00

[58] Field of Search ......178/68, 88, 69.5 R; 307/269; 328/26, 32, 63, 72, 138–140

[56] References Cited

UNITED STATES PATENTS

| | | | |
|---|---|---|---|
| 3,154,777 | 10/1964 | Thomas | 178/68 X |
| 3,249,763 | 5/1966 | Hopner | 328/32 X |
| 3,567,959 | 3/1971 | Kaneko et al. | 328/63 X |
| 3,599,103 | 8/1971 | Nussbaumer | 328/63 X |

*Primary Examiner*—Stanley D. Miller, Jr.
*Attorney*—K. Mullerheim et al.

[57] ABSTRACT

A circuit for producing a timing signal from a modified duobinary data signal. This data signal is capacitively coupled through four full-wave rectifiers that are connected in series. The outputs of the third and fourth rectifiers are DC coupled through an adder to a bandpass filter which passes a timing signal that has a fixed phase relationship with respect to the timing signal that was originally employed to produce the modified duobinary signal. The filtered signal is delayed, squared in a limiter, and applied to a zero crossing detector which produces a train of clock timing pulses.

10 Claims, 3 Drawing Figures

INVENTOR.
BERTON E. DOTTER JR.
BY Russell A. Cannon
AGENT

INVENTOR.
BERTON E. DOTTER JR.
BY Russell A. Connor
AGENT

TIMING RECOVERY CIRCUIT FOR USE IN MODIFIED DUOBINARY TRANSMISSION SYSTEM

BACKGROUND OF INVENTION

This invention relates to data systems and more particularly to circuitry for reproducing a timing signal from a modified duobinary data signal.

The extensive use of computers in data processing has created requirements for transmission of large volumes of binary data over available communication channels such as telephone lines. Although conventional binary transmission techniques may be used in low speed applications, multi-level systems including duobinary, modified duobinary, quaternary and bipolar systems are finding increased use because of their higher speed capabilities. Modified duobinary data transmission systems are described in U.S. Pat. No. 3,457,510. In order to decode a received data signal by periodically sampling it in specified time slots, synchronized clock timing signals must be provided in transmitting and receiving equipment. If separate clock generators are employed in each transmitter and receiver, special circuitry must be provided to synchronize the generators. One technique for providing a timing signal in receiver equipment is to perform a single full-wave rectification of the received data signal and to filter the rectified signal. Since the rectified signal contains phase information regarding the original timing signal, there is a fixed phase relationship between the original and resultant timing signals. This resultant timing signal can be employed to synchronize a local clock generator in the receiver or operated on to produce a train of clock timing pulses. This technique produces acceptable timing signals from binary, regular duobinary, quaternary, and bipolar data signals. It does not work well for modified duobinary data signals, however, since the intersymbol interference and phase structure thereof may cause the resultant timing signal to vanish. Applicant has discovered that a satisfactory timing signal for modified duobinary can be obtained by successively performing several full-wave rectifications of a modified duobinary data signal prior to filtering.

An object of this invention is the provision of circuitry for reproducing a timing signal from a modified duobinary data signal.

DESCRIPTION OF DRAWINGS

This invention will be more fully understood from the following detailed description thereof together with the drawings in which:

FIG. 2 is waveforms that are produced at various points in the circuit of FIG. 1 and are useful in explaining the operation of this invention, each waveform and the point of generation thereof in FIG. 1 being designated by the same letter, wherein

- waveform A represents the train of clock timing pulses employed in a transmitter (not shown) to produce a modified duobinary data signal B;
- waveform C represents the eye pattern for a modified duobinary signal;
- waveforms D–G, inclusive, represent output signals of associated full-wave rectifiers in FIG. 1;
- waveform H, I and J represent the output signals of the filter, phase shifter and limiter, respectively, in FIG. 1; and
- waveform K represents the train of reproduced clock timing pulses from the zero crossing detector in FIG. 1.

DESCRIPTION OF PREFERRED EMBODIMENTS

Figure 1:
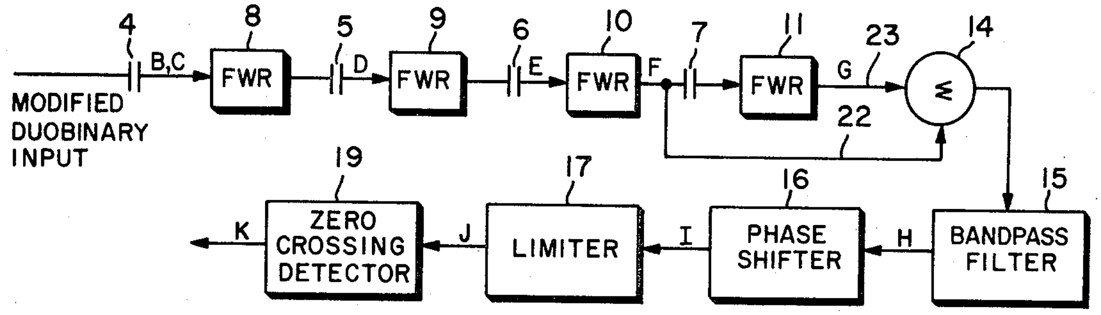
FIG. 1 is a block diagram of a timing recovery circuit embodying this invention.

Referring now to FIG. 1, a timing recovering circuit embodying this invention comprises capacitors 4–7 and associated full-wave rectifiers 8–11, adder circuit 14, bandpass filter 15, phase shifter 16, limiter 17, and zero crossing detector 19 which are connected in series. A modified duobinary data signal that is AC coupled through capacitor 4 to full-wave rectifier 8 is represented by waveform B. In the following discussion and as described more fully hereinafter, the input signal applied to rectifier 8 is actually considered to be the eye pattern C for a modified duobinary signal. This aids in understanding this invention without affecting the operation thereof.

The outputs F and G of the associated rectifiers 10 and 11 are coupled on lines 22 and 23, respectively, to adder 14. Filter 15 is preferably a notch filter having a very narrow passband. The center frequency of the filter passband is equal to the pulse repetition frequency of the clock pulses in waveform A that are used to generate the modified duobinary signal C. The filter is designed to ring over several pulse intervals T of the data signal B, C after an input signal is removed therefrom. Phase shifter 16 introduces a 90° phase delay in the filtered signal H to cause the signals in waveforms A and I to be 90° out-of-phase, i.e., to center the zero crossings in waveform I in the data slots of the received data signals as discussed more fully hereinafter. Limiter 17 has sufficient gain to provide a square wave output.

Figure 3:
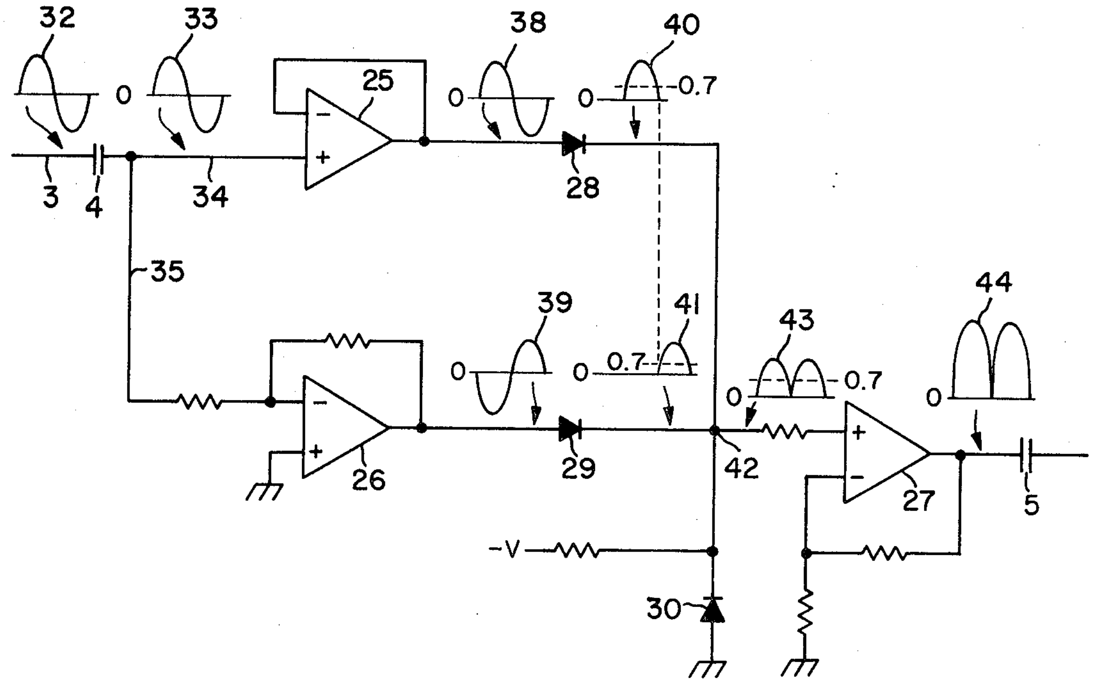
FIG. 3 is a schematic circuit diagram of one of the full-wave rectifiers in FIG. 1.

Since the structures of the rectifiers 8-11 are identical, only rectifier 8 will be described in detail in relation to FIG. 3. This rectifier comprises a noninverting voltage follower unity gain amplifier 25, a unity gain inverter amplifier 26, noninverting amplifier 27, rectifier diodes 28 and 29, and diode 30 which produces an offset voltage that cancels the offset voltages of diodes 28 and 29. Operational amplifiers are employed in the rectifiers to increase the stability of these circuits.

The operation of rectifier 8 will be described in relation to a sinusoidal signal 32 which is applied thereto. Capacitor 4 and the virtual ground of amplifier 26 cause the signal 33 on lines 34 and 35 to be centered about the ground reference potential or zero (0)volts. If the input signal 32 were other than sinusoidal the resultant coupled signal 33 would be oriented with respect to a different reference potential such that the average powers in the portions of signal 33 above and below the reference potential are equal. The associated output signals 38 and 39 of amplifiers 25 and 26 are also centered about zero (0) and are in-phase and out-of-phase, respectively, with signal 33. The rectifier diodes 28 and 29 conduct during the positive half-cycles of signals 38 and 39 to produce the output signals 40 and 41, respectively, that combine at junction 42 to produce the signal 43 which is applied to amplifier 27.

Diode 30 is caused to conduct by the negative supply voltage −V to bias junction 42 at −0.7 volt with respect to the zero (0) volt ground reference potential. This 0.7 volt negative offset voltage compensates for the corresponding +0.7 volt drop across each rectifier diode so that the signals 40, 41 and 43 are clamped to 0 volts. Thus, the signals 40 and 41 are exact replicas of the positive half-cycles of associated input signals 38 and 39. This offset voltage of diode 30 therefore prevents distortion and clipping of the portions of the signals 40, 41 and 43 below +0.7 volt. Circuit 27 amplifies the combined signal 43 to produce the output signal 44 having an amplitude that is equal to the peak-to-peak amplitude of the input signal 32.

Referring now to FIG. 1, the train of clock pulses in waveform A is employed in a transmitter (not shown) to produce the modified duobinary signal similar to waveform B. This signal may have a value of 0, +1, or −1 during any pulse interval T. Waveform B represents one of many possible modified duobinary sequences in the time domain. The eye pattern waveform C represents a superposition of all possible modified duobinary sequences in the time domain. It illustrates the range of values that the modified duobinary data signal B may have over a pulse interval T. This eye pattern is formed by dividing the signal B into segments of an integral number of pulse intervals and superimposing these segments over the same one segment. An eye pattern is observed on an oscilloscope by applying the data signal B to the horizontal input thereof and using a horizontal sweep that is synchronized with the pulse rate. The waveform C is made up of only eight discrete waveforms for the sake of clarity. The crosshatched openings or eyes 47 in wave C are useful in evaluating the performance of a data system. Vertical lines such as line 48 drawn through the center of the eyes 47 show a superposition of the three possible values (0, +1, −1) of a modified duobinary signal. The data signal is sliced and sampled at the maximum eye opening indicated here to reconstruct the transmitted data at times *t*2, *t*4, etc. There are fixed phase relationships between the modified duobinary sequences in waveform C.

The eye pattern C is indicated as the input signal to rectifier 8 since it aids in visualizing generation of the timing signals H–K therefrom. The waveforms D, E, F and G represent the signal C after one, two, three and four rectifications, respectively. Since the modified duobinary input signal C is symmetrical and has no DC component, it is folded about its center (0) or fold line f by the first rectifier 8. The rectified signals D, E and F, however, are folded about fold lines f which are automatically set by the coupling capacitors 5, 6 and 7, respectively, and which do not go through the center of these waves. Each time an input wave is folded about the axis *f* by an associated rectifier, a new power spectrum is formed with altered phase relationships between signal components. Applicant has discovered that a signal component having a frequency equal to the pulse repetition frequency of the clock pulses in waveform A is one of the stronger discrete signal components in the rectified signals produced after three or four rectifications have altered the original phase structure of the modified duobinary signal C. It was also determined empirically that certain classes of input binary data patterns produce modified duobinary signals such that the output F of the third rectifier 10 contains a better timing signal whereas for other classes the output G of the fourth rectifier 11 contains the better timing signal. In order to insure generation of the best overall timing signal, the outputs F and G of these rectifiers are combined in adder 14 prior to filtering by circuit 15.

Consider that the transmitter clock pulses in signal A have a pulse repetition frequency (prf) of 4800 bits per second (bps). This means that the signal components such as component 50 in waveform C have frequencies of 1200 Hz whereas the eyes 47 therein have a repetition frequency of 4800 bps. After one rectification the frequency of component 50 essentially doubles to 2400 Hz in waveform D. Each rectification causes a further increase in the frequency of this signal component. Reference to waveform G reveals that peak positive values of the signal 50 are aligned with the eyes in waveform C. The component 51 is shown with a larger amplitude than, and out-of-phase with, component 50 in waveform G. Component 51 actually contains much less energy, however, than the other signal component 50 because the former occurs much less often. The component 51 is really caused by intersymbol interference and is of little value in reproducing the timing pulses. The signal component 50 is filtered from the rectified signal G by filter 15 to produce the timing signal.

The sinusoidal signal H passed by filter 15 is in phase with and has a frequency equal to that of the original transmitter timing signal A. This signal H can be employed directly as a timing signal, used to phase-lock a separate clock generator (not shown) in a receiver, or operated on to produce a train K of clock pulses that set the sampling times *t*2, *t*4, etc., of the modified duobinary signal B, C. Phase shifter 16 introduces a 90° phase delay in the filtered signal H to produce the signal I having zero crossings aligned with the centers of the eyes in waveform C for correct time sampling of the modified duobinary signal. The squared signal J from limiter 17 is detected by circuit 19 which produces a clock timing pulse in waveform K each time the signal J crosses the zero reference axis.

In practice, the modified duobinary signal B is applied in the transmitter to a scrambler, as is well known in the prior art and not shown here, which rearranges the signal B so that the transmitted signal actually contains a timing signal even if no binary data is being transmitted.

What is claimed is:

1. A circuit for recovering a timing signal from a modified duobinary data signal that is produced with clock timing pulses having a prescribed pulse repetition frequency comprising a plurality of full-wave rectifiers connected in series, first means for coupling the modified duobinary signal to the input of the first one of said rectifiers, and means for selecting the recovered timing signal from the output signal of the last one of said rectifiers.

2. The circuit according to claim 1 wherein said selecting means comprises a filter having a narrow passband for passing a signal component in the output signal of the last one of said rectifiers having a frequency equal to the pulse repetition frequency of the clock timing pulses.

3. The circuit according to claim 1 including three rectifiers.

4. The circuit according to claim 1 including four rectifiers.

5. The circuit according to claim 4 wherein said selecting means comprises a filter having a narrow passband with a center frequency equal to the prescribed pulse repetition frequency and second means coupling the output signals of the third and fourth ones of said rectifiers to the input of said filter.

6. The circuit according to claim 5 including means for producing an output pulse when the amplitude of the output of said filter passes a prescribed reference level.

7. The circuit according to claim 6 wherein said producing means includes a zero crossing detector.

8. The circuit according to claim 5 including third means for AC coupling the modified duobinary signal to said first rectifier and for AC coupling said rectifiers together to establish a reference level through the outputs thereof.

9. The circuit according to claim 1 wherein each of said rectifiers includes means for establishing an offset voltage associated with the rectifier output signal to compensate for the voltage drop caused by the rectifying elements thereof.

10. The method of recovering a timing signal from a modified duobinary data signal that is produced with clock timing pulses having a prescribed pulse repetition frequency, comprising the steps of performing a plurality of successive full-wave rectifications of the modified duobinary signal, and filtering a multiply rectified signal in a circuit having a narrow passband passing a signal having a frequency equal to the prescribed pulse repetition frequency of the clock timing pulses.

* * * * *

UNITED STATES PATENT OFFICE
CERTIFICATE OF CORRECTION

Patent No. 3,707,683 Dated December 26, 1972

Inventor(s) Berton E. Dotter, Jr.

Figure 2:
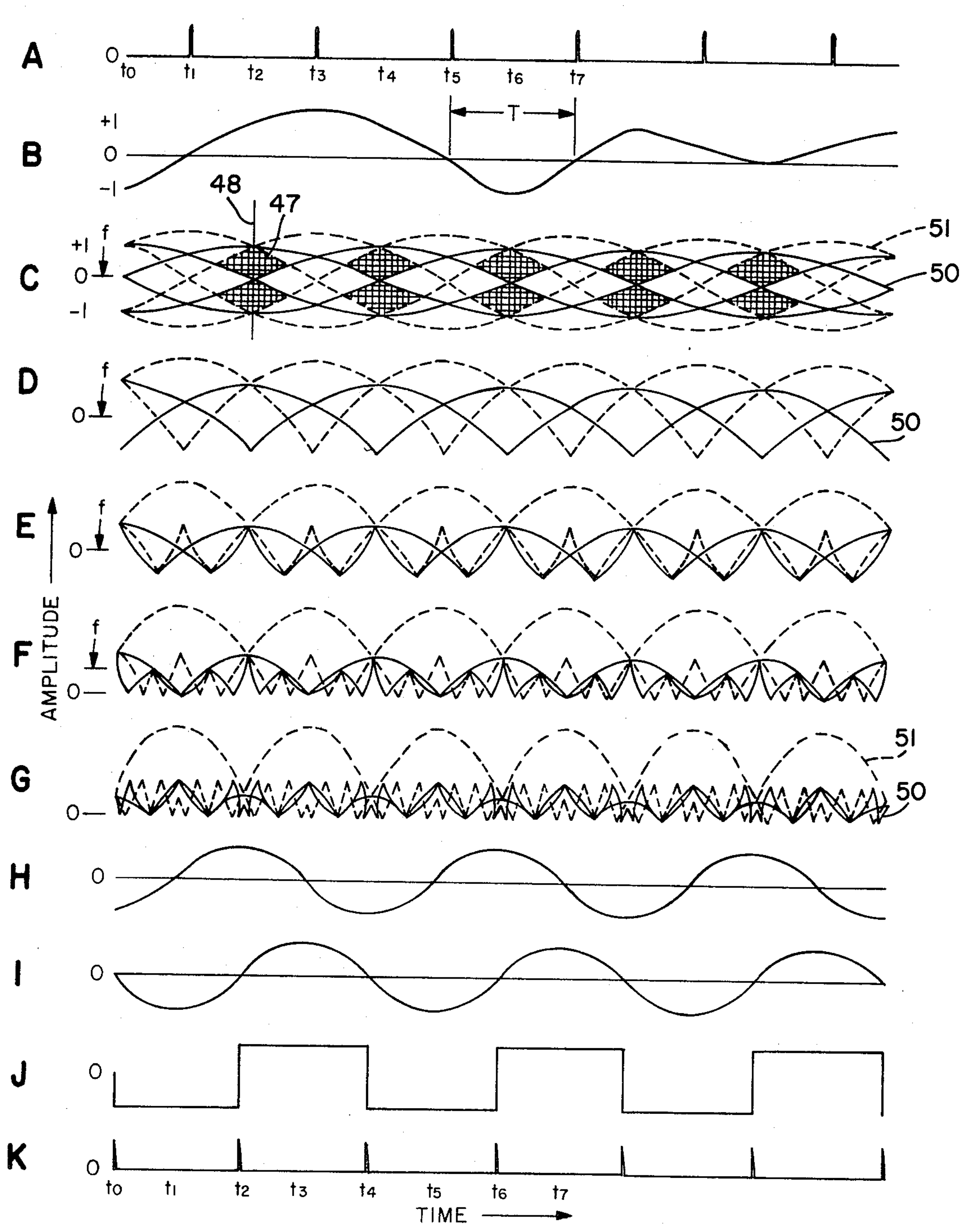

It is certified that error appears in the above-identified patent and that said Letters Patent are hereby corrected as shown below:

In the title, after "DUOBINARY" insert -- DATA --.
In sheet 2 of the drawings, waveforms H, I, and J in FIG. 2 should be as shown below, the original waveform K being reproduced below as a reference to FIG. 2:

FIG. 2

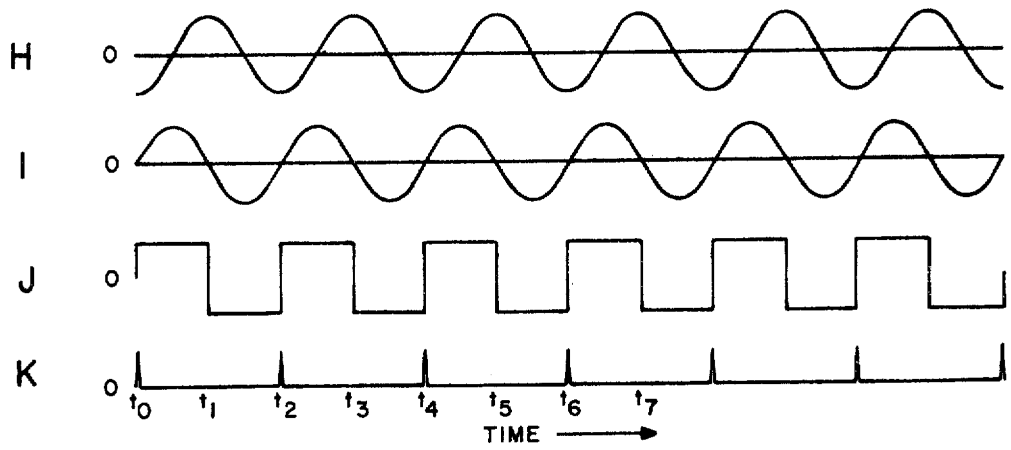

Signed and sealed this 19th day of February 1974.

(SEAL)
Attest:

EDWARD M.FLETCHER,JR.
Attesting Officer

C. MARSHALL DANN
Commissioner of Patents